March 4, 1924.
L. BIRK
1,485,951
COMBINED LIQUID LEVEL AND SPECIFIC GRAVITY INDICATOR
Filed Dec. 10, 1921
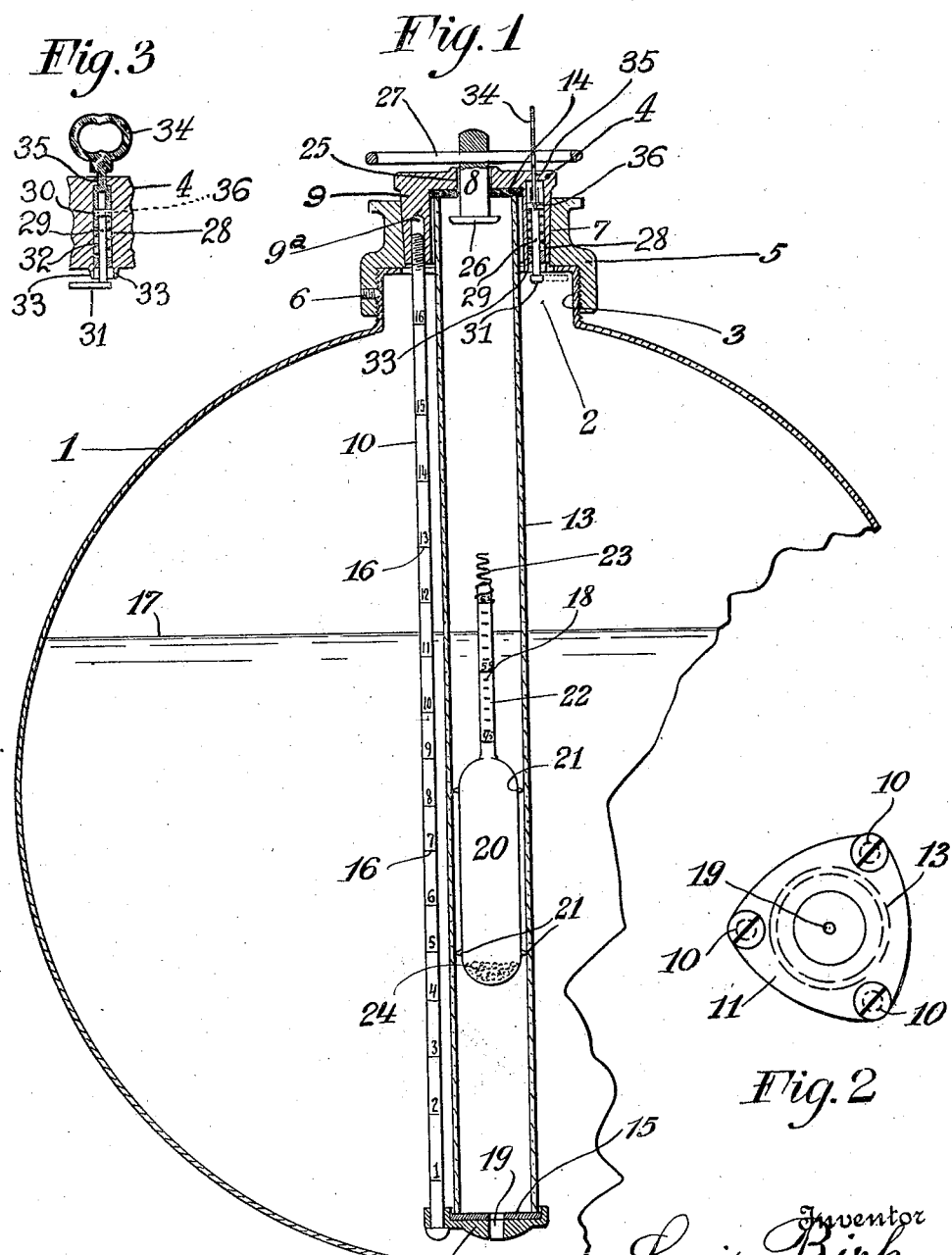

Patented Mar. 4, 1924.

1,485,951

UNITED STATES PATENT OFFICE.

LOUIS BIRK, OF BROOKLYN, NEW YORK, ASSIGNOR TO INTERNATIONAL GAUGE & APPLIANCE CORPORATION, A CORPORATION OF NEW YORK.

COMBINED LIQUID-LEVEL AND SPECIFIC-GRAVITY INDICATOR.

Application filed December 10, 1921. Serial No. 521,310.

*To all whom it may concern:*

Be it known that I, LOUIS BIRK, a citizen of the United States, and resident of Brooklyn, in the county of Kings and State of New York, have invented certain new and useful Improvements in Combined Liquid-Level and Specific-Gravity Indicators, of which the following is a specification.

This invention relates to measuring devices and the object of the invention is to provide a measuring device adapted to be used in gasoline tanks on automobiles for measuring the quantity as well as the specific gravity of the gasoline fuel.

One object of the invention is to provide a generally improved measuring device for the purpose and of the type of measuring devices disclosed in the U. S. Patent No. 1,385,270. Another object is to provide a device of the class described adapted for measuring the specific gravity of the gasoline. Still other objects will appear as this specification proceeds.

Accordingly my invention is embodied in a measuring device arranged and designed as hereinafter set forth, while reference is had to the accompanying drawing illustrating my invention and in which—

Fig. 1 is a sectional view of the measuring device mounted in a gasoline tank shown in section and with parts broken away, Fig. 2 is a bottom view of the device, and Fig. 3 is a detail view in section of a lock for the device.

Referring to the drawing the reference numeral 1 denotes a gasoline fuel tank of the type used on automobiles, and which tank is usually provided with an inlet 2 formed within a threaded neck 3. The particular form of inlet 2 and neck 3 depends upon the particular make of automobile, and the measuring device will be made accordingly.

In this instance the device comprises a stopper 4 adapted to be seated in a ring 5 which latter is screwed onto the neck 3 and further secured as by a set screw 6. The stopper 4 and the interior wall 7 of the ring are tapered as shown. The stopper is provided with bosses 9, preferably three in number (only one is shown) and into each boss 9 is screwed a protecting rod 10, three in all, see Figure 2.

The bottom of the device is formed by a bottom piece 11 through which the rods 10 pass. Between the stopper 4 and the bottom piece 11 there is mounted a gage glass or glass tube 13 which is held in position by the aforesaid three rods 10. Cork washers 14 and 15 are placed at each end of the glass tube to prevent breakage of the tube when the rods are screwed into threaded openings 9ª in the bosses 9. One of the rods is provided with graduations 16 for measuring the quantity of the gasoline 17 in the tank 1.

The bottom piece and washer are apertured as at 19 and within the gage glass or tube 13 is contained a hydrometer 20 which is provided with tits 21 for guiding it within the tube and to prevent breakage. The hydrometer has a stem 22, graduated at 18 to indicate the specific gravity of the gasoline. A cushion member such as a spring 23 is secured to the stem to prevent breakage in case the device should be inverted or in shipping. The hydrometer is provided with a weight 24 which may consist of suitable metal balls. The cork washer 15 at the bottom also serves as a cushion for the bottom of the hydrometer 20.

The stopper 4 is apertured as at 25 and a stem 8 passes through the aperture and is provided with a valve 26 within the glass tube. Outside the device the stem carries a ring 27.

The ring 5, or other suitable member depending upon the construction of the tank outlet, constitutes a means for mounting or positioning the device within the tank, in which the device is lowered until the stopper 4 is seated in the member 5. The gasoline within the tank fills the glass tube 13 and, of course, the hydrometer will float in the liquid which enters the tube through the opening 19 in the bottom.

When the device is removed from the tank by taking hold of the ring 27, the valve 26 will automatically close the aperture at 25, and one may then read directly on the hydrometer scale 18 the specific gravity of the liquid and accordingly be informed as to its quality.

In the same manner the quantity of gasoline within the tank may be read on the scale 16 by the mark caused by the gasoline on the gradation rod 10.

The gasoline will be retained within the tube 13 upon its withdrawal from the tank, because the closing of the aperture 25 prevents the atmospheric pressure from acting upon the upper surface of the gasoline within the tube. After the device has been removed, the tank may be replenished as usual. When the device is again inserted the weight of the stem 8 will open the valve 26 by lowering it.

The device may also be used for withdrawing small quantities of gasoline from the tank, in that after the device has been removed, the stem 8 and valve 26 may be pushed inwardly to open the passage 25. This is of advantage when it is desired to use gasoline for priming the motor or for other purposes.

Locking means are provided as follows: The stopper 4 is provided with a recess 28 which contains a locking bolt 29 having a collar 30 and a head 31. A spring 32 keeps the bolt normally in raised position with the top of the bolt against the roof of the recess 28, and the head of the bolt extending in under the adjacent fixed neck 3. The head of the bolt is then confined between the depending wall 33 and at the bottom of the member 5 shown most clearly in Figure 3.

Unauthorized removal of the device is impossible under these conditions. When it is desired to remove the device, a key 34 is inserted through the slot 35. The key engages slits 36 in the bolt collar 30 whereby, after depression of the bolt to disengage the head from the wall 33, the bolt may be rotated to the position shown in Figure 3 and in full lines in Figure 1 when the device may be removed, the head 31 no longer forming an obstruction. The key may thereafter be left in the lock or withdrawn. After the device has been again positioned in the tank, the lock is operated into locking position by the key which is thereafter withdrawn.

It is thought that the foregoing description taken in connection with the drawing clearly discloses the invention.

It will further be understood, that I do not intend limiting my invention to the use with automobile tanks or with any particular liquid. Again, alterations and changes in the detailed construction, the dimensions, shape and arrangements of the parts may be made without departing from the principle of the invention and the scope of the appended claim.

I claim:—

A measuring device comprising a stopper, a bottom member, a glass tube interposed between said stopper and said member, a plurality of rods for securing said bottom member and glass tube to the stopper and for protecting said tube against breakage, the said stopper and the said bottom member each being provided with an opening communicating with the interior of the said tube, a valve for closing the said opening in the stopper, a hydrometer supported within the said tube, means on said hydrometer for guiding the same within the tube, a spring supported at the upper end of said hydrometer and cushioning means interposed between the said tube and the said bottom member.

LOUIS BIRK.